United States Patent [19]

Hansen

[11] Patent Number: 5,050,924
[45] Date of Patent: Sep. 24, 1991

[54] EXPANDABLE TARPAULIN ASSEMBLY

[76] Inventor: George G. Hansen, 303 Overlook Dr., Boulder Creek, Calif. 95006

[21] Appl. No.: 647,835

[22] Filed: Jan. 30, 1991

[51] Int. Cl.⁵ ............................................. B60P 7/02
[52] U.S. Cl. .................... 296/100; 410/97; 52/3
[58] Field of Search ............. 296/100, 136; 150/154, 150/166; 410/97; 52/3

[56] References Cited

U.S. PATENT DOCUMENTS

| | | | |
|---|---|---|---|
| 2,455,237 | 11/1948 | Davis | 52/3 |
| 2,705,461 | 4/1955 | Campbell | 410/97 |
| 2,807,499 | 9/1957 | Duddleston | 296/100 |
| 3,397,009 | 9/1966 | Landenberger | 296/100 |
| 3,785,451 | 8/1974 | McCord | 180/69.1 |
| 4,795,207 | 1/1989 | Clarke | 296/136 |
| 4,900,204 | 2/1990 | Summers | 410/97 |
| 4,923,240 | 5/1990 | Swanson | 296/100 |
| 4,938,522 | 7/1990 | Herron et al. | 296/136 |
| 4,979,776 | 12/1990 | Schweickert | 296/100 |

OTHER PUBLICATIONS

WO 90/01433 PCT Publication Finell Feb. 22, 1990.

Primary Examiner—Robert R. Song
Attorney, Agent, or Firm—The Dulin Law Firm

[57] ABSTRACT

The invention relates to an expandable tarpaulin comprising plastic or canvas materials, an X-pattern array of elasticized reinforcing and tie down straps or cords, and one or more elasticized perimeter cords. A problem with previous tarpaulins is that they are difficult to tie down over varying irregular sized loads. As a result, loose edges of tarp material flap in the wind causing distracting noise and damage to the vehicle, the load and the tarpaulin. Also the loose ends permit a wind tunnel effect which induces suction, loss of particulate loads causing road hazards. These problems are avoided by means of an expandable tarpaulin according to the invention which is characterized by a unitary expandable tarpaulin with elasticized reinforcing, tie downs, and perimeter hand holds, cord or straps. A safety reflective coating on selected portions of the tarp sheet may also be employed.

20 Claims, 1 Drawing Sheet

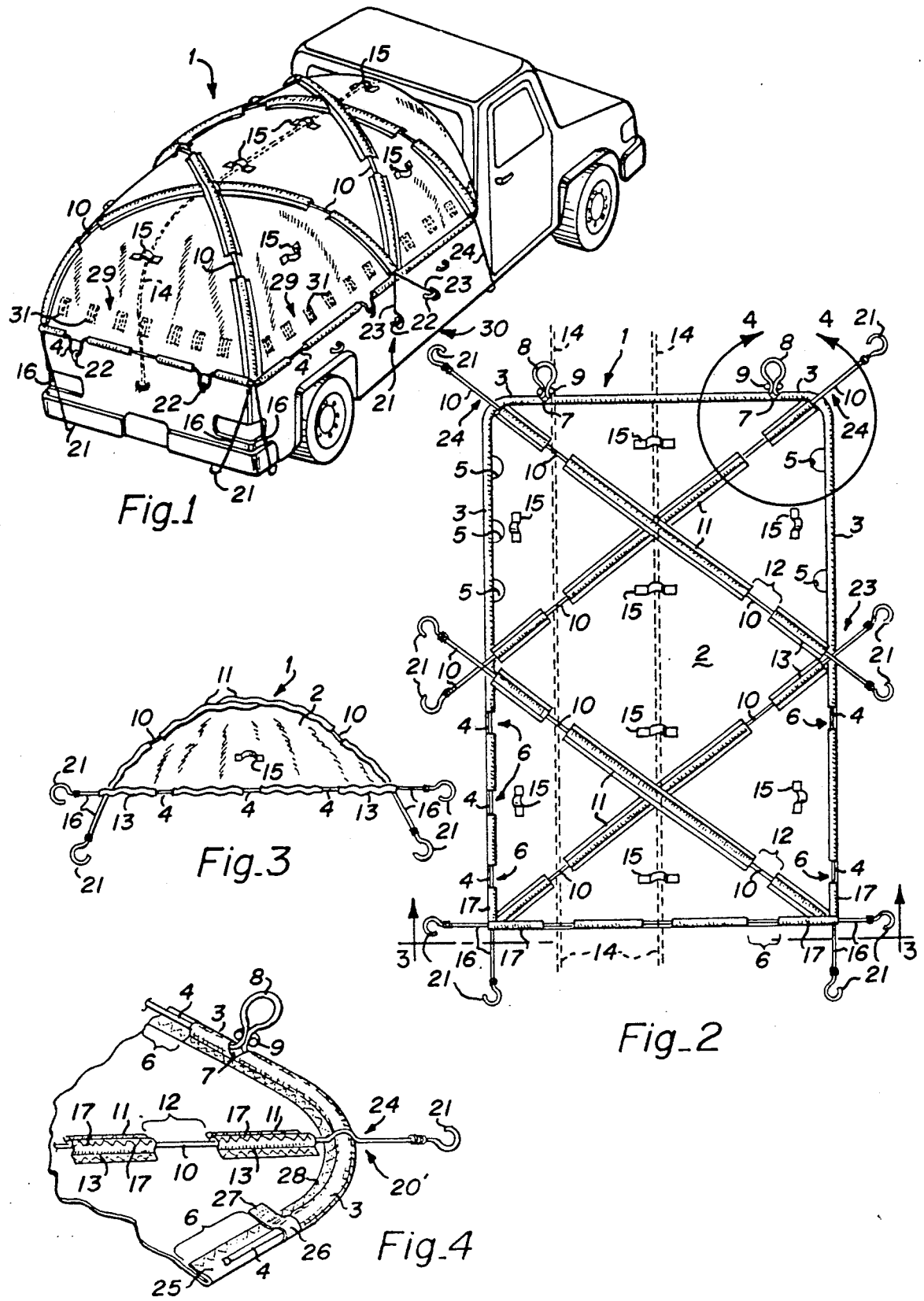

EXPANDABLE TARPAULIN ASSEMBLY

FIELD

This invention relates to tarpaulins and more specifically, to expandable tarpaulins having attached elasticized members which aid in securing the tarpaulin to regular and irregular loads.

BACKGROUND

Utility vehicles, namely trucks, commonly use tarpaulins for two basic purposes: (1) Protecting loads from the elements, and (2) preventing loss of loaded materials. However, a serious disadvantage in the use of existing tarps is that they are difficult to tie down, and as a result they flap in the wind. The flapping is noisy, thereby distracting the vehicle operator, and it causes damage to the vehicle, the load and the tarpaulin.

Additionally, and perhaps more seriously, improperly covered loads result in debris flying out, damaging vehicles and leaving hazards in the roadway. Improperly fastened tarp margins can also promote a wind tunnel or suction effect that results in siphoning-out of particulate materials, such as sand, dirt, small gravel, paper materials and garden clippings.

Another problem with conventional tarps is the difficulty of putting tarps over loads and of then throwing or pulling cords on ropes thereover. The tarps and ropes snag on the load, and ropes tend to pull the tarps askew. Conventional tarps are usually dark colored, grey, black or blue. This is a safety hazard as at night or in low light conditions, such as inclement weather, objects or loads on vehicles are difficult to see and easy to run into.

A wide variety of solutions have been attempted to provide for suitable tarpaulin tie downs. Among the solutions are several U.S. patents.

For example, Summers U.S. Pat. No. 4,900,204 shows an elasticized cargo net overlying a tarpaulin, and loops of the elastic outer perimeter are drawn through grommets in the outer periphery of the tarpaulin. However, the cargo net is not attached to the tarpaulin, and it has a radial configuration, like a spider web, extending outwardly from a common center and having concentric rings spaced outwardly therefrom.

Herin U.S. Pat. No. 4,938,522 shows an automotive cover with windows therein and a zippered flap to permit access to the door of the automobile without taking the cover off. The cover is "fitted", in that it is contoured to the shape of the automobile, and it has an elastic shock cord on the periphery to snug the ends down underneath the fenders and bumpers of the automobile. This is a light weight cover to protect a new automobile in the open air at a show room and is not meant as a tarpaulin to cover or assist in securing varying shaped loads of debris in transit.

Campbell U.S. Pat. No. 2,705,461 shows a cargo net fabricated from a flexible cable in which the cables are retained in diamond pattern byswaged fittings. This permits the cable to be secured in a zig-zag fashion to form the overall net which looks like a square grid. The cables are comprised of steel and are not stretchable. The cargo net is designed to facilitate the securing of loads in cargo aircraft.

Finell PCT publication WO 90/01433 shows a tarpaulin having loops attached to the perimeter as well as triangular gores of material functioning as fastening means. Also, there are woven reinforcing strips oriented 90° transverse to the longitudinal axis of the tarpaulin. During the weaving of the tarpaulin, the reinforcing areas are woven with multi-filament weft yarns having a greater thickness and tensile strength than warp yarns. The fastening loops can also be attached to the ends of the reinforced areas.

Davis U.S. Pat. No. 2,455,237 shows a cargo blanket having stitched thereto a non-elastic reinforcing webbing in a rectangular gridlike pattern. Grommets are provided at the corners and at the intersection of the reinforcing webbing with a webbing around the outer perimeter.

Landenberger U.S. Pat. No. 3,397,009 shows a rolling mechanism mounted on top of a truck for rolling up a tarpaulin. It also illustrates the use of elasticized shock or bungee cords securing the tarp to the truck, which cords appear to engage grommets near the periphery of the tarpaulin.

Clarke U.S. Pat. No. 4,795,207 shows a protective cover for an entire vehicle, which cover has an elasticized periphery to snug the cover under the fenders and bumpers of the vehicle. Several grommets can be used for tie-downs, and a specially located grommet can permit an eye to project therethrough, to which a lock can be secured preventing theft of the cover.

McCord U.S. Pat. No. 3,785,451 is directed to an automobile diaper comprising a fireproof sheet material with a center section having a mass of absorbent material therein. Grommets are provided along the periphery to permit suspending the diaper under the engine of the vehicle to absorb oil dripping therefrom.

Accordingly, there is a need in the art for an improved unitary tarpaulin/tie down assembly that has expandable properties for ease of use and secure tie down means to prevent flapping damage to the vehicle, the load or the tarpaulin during use, and which prevents loss of load contents in violation of state laws and has safety features improving visibility.

THE INVENTION

Objects

It is among the objects of this invention to provide an expandable tarpaulin assembly that has properties of expanding to accommodate varying size loads, and has integral secure tie down means in association therewith.

It is another object of this invention to provide an expandable tarpaulin that has an elasticized perimeter margin to provide securing all loose edges and corners of the tarpaulin to prevent flapping and wind tunnel induced suction loss of load contents.

It is another object of this invention to provide an improved tarpaulin with elasticized securing members associated with the tarpaulin which stretch completely across the tarpaulin and which have hooks or other means for tying down these elasticized reinforcing members and the tarpaulin.

It is another object of the invention to provide a tarp having improved safety features comprising light reflective means, preferably reflective coatings, which vastly improve the visibility of tarps under low light conditions.

It is another object of this invention to provide an improved pattern for reinforcement members of a tarpaulin.

It is another object of this invention to provide an improved tie down means for the periphery of tarpaulins for securing to the vehicle after draping over a load.

Still further and other objects of this invention will be evident from this application, the claims and the drawings.

DRAWINGS

The invention as illustrated in the drawings in which:

FIG. 1 shows in perspective the expandable tarpaulin and reinforcing cord assembly of the invention as it is used expanded over and securing a load to a utility vehicle.

FIG. 2 shows a plan view of the expandable tarpaulin/elasticized reinforcing cord assembly of this invention in the fully expanded configuration;

FIG. 3 shows the expandable tarpaulin of this invention in the contracted configuration as viewed along lines 3—3 of FIG. 2.

FIG. 4 shows a perspective view of a corner of the tarpaulin of FIG. 2;

SUMMARY

The invention relates to an expandable tarpaulin assembly comprising a tarpaulin of suitable sheet material, such as plastic or canvas, having a spaced array of elasticized tie down straps or cords which are attached to the tarpaulin sheet, preferably by being sewn or attached thereto by special strips of material, or other engagement means. In the preferred embodiment, the expandable tie down cords are "bungee" or shock cords, or elasticized (synthetic rubber) straps. These are stretched before being attached to the tarpaulin sheet. Upon relaxation of the stretched reinforcing tie down cords, the tarpaulin is retracted into a gathered condition. In addition, the tarpaulin assembly includes a marginal edge having a sewn seam spaced inwardly of the outer edge and which contains a circumferential elasticized cord. This elasticized periphery provides a snug fit to irregular contours of the vehicle or load, and prevents the edges from flapping and reduces wind suction of load contents, without the necessity of all edges being carefully tied down.

In a preferred embodiment, the reinforcing elasticized or rubber tie downs extend beyond the outer edges of the tarpaulin sheet. These extensions may terminate in loops or hooks for engagement with hook eyes or hold down hooks or brackets on a vehicle. In addition, portions of the tarpaulin adjacent the marginal edges, but medial of the elasticized margin may be cut out and reinforced to permit hooks to engage the elasticized margin. In the alternative, grommets may be placed adjacent the marginal edges to engage ropes or hooks from the vehicle or other platform containing the load.

The elasticized nature of the reinforcing cords provides significant stowage advantages. Upon relaxation, the tarpaulin is gathered into a small bundle or roll, and the portions of the reinforcing webs which extend beyond the edge of the tarpaulin can then be wrapped around and secured to themselves or to the grommets or apertures in the edges of the tarpaulin to make a self-securing bundle.

In use, the tarpaulin is unfolded or unrolled and pulled over the top of the load with the elasticized reinforcing webbing preferably being on the outer (upper) surface of the sheet. Then, the tarpaulin assembly is expanded down over the load onto the body or side walls of the load bucket of the vehicle. Since the tarpaulin sheet is a unitary sheet, it slides easily over the load.

A typical tarpaulin in accordance with this invention having a retracted width of four feet can normally stretch to about six feet, a six footer could stretch to eight or nine feet, a nine footer could stretch to twelve to fourteen feet, etc.

Thus, the tarpaulin assembly of this invention is universal. That is, one tarpaulin can be used to fit and cover varying loads in the bed of a truck or other vehicle. For example, where the load does not exceed the height of the side walls of the truck bed, the tarpaulin can be in a relatively retracted condition placed horizontally spanning between the side walls of the bed to cover the load. The tarp is secured by the elasticized cords to engagement hooks or eyes on the bed of the vehicle. The same tarpaulin can be used where the load is heaped. The tarpaulin is then stretched to its full extent and the elasticized cords are secured to the vehicle engagement means such as sidewall hooks or hook eyes.

Because the elasticized reinforcing cords are engaged to the tarpaulin, by adjusting the position of the tarpaulin, the tie down cords are automatically adjusted. The cords do not catch on the middle of the load which may not be able to be easily reached by the user. Therefore, covering and adjusting the tarpaulin becomes a simple one-step placement of both the tarpaulin and the reinforcing tie down cord system.

This is in contrast to currently available systems which either have individual cords that must be thrown back and forth across the load, or a spider web type cargo net that must be separately thrown over a tarpaulin or load. The currently available systems are hard to adjust because of the many loops which can catch on projecting edges of a load. This is particularly difficult in the case of a load such as brush where there are numerous projecting branches. With such an irregular load, it is extremely difficult to properly adjust a cargo net and which usually results in one or another portion being overstrained, while still other portions are more or less relaxed permitting portions of the load to escape or shift thereunder.

The pattern of the reinforcing cords is organized by dividing the tarpaulin area into a plurality of regions, and attaching the expandable reinforcing cords in X patterns thereacross. Thus, for example, an 8×10 tarp may be divided into two subareas of 4×5, and the reinforcing cords may be employed with two X patterns such that the X's merge at the adjacent interior corners of the two 4×5 rectangles, and extend to the four outer corners of the 8×10 rectangles. In addition, one or more transverse reinforcing cords, which may be stretchable or non-stretchable, may also be employed to mark the subarea boundaries.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 2 shows in plan view one embodiment of the tarpaulin 1 of this invention. The tarpaulin sheet material 2 is bounded on all four marginal edges by a continuous or relieved sleeve 3., preferably formed by folding over and stitching a one to two inch portion of a marginal edge, within which is passed an elasticized cord 4, the stretched length of which is from 95 to about 125% the length of the perimeter of the tarpaulin 1. This is described in more detail below.

The retracted (relaxed) length of the perimeter elasticized cord 4 is substantially shorter than the perimeter sleeve, so that the tarpaulin, when thrown over a load or truck bed, draws the edges of the sheet down tight to the load or the truck body. This serves a variety of functions, the primary of which is to prevent the flapping of the perimeter edge of the tarpaulin as the vehicle moves, so that wind does not have access under the tarp causing a ballooning and sail affect. This helps the aerodynamics of the load, thus conserving fuel. This also prevents or reduces the suctioning-out of load contents. This is of particular concern with loads of particulate materials such as dirt, grain, leaf clippings, sand, etc.

Further since there is essentially no flapping of the tarpaulin edges in the wind, damage to the load, the vehicle and the tarpaulin is essentially eliminated. The annoying and distracting noise of flapping tarp is also eliminated. In addition, the perimeter elasticized cord helps to prevent cupping of the tarp which collects water during rain, which water can seep into the load or spill onto the load when removing the tarp. The tarp is thus more self-draining.

As a preferred option, portions of the tarp perimeter sleeve 6 are relieved providing hand access to the perimeter elasticized cord. This serves a number of functions. First, it provides a hand-hold when pulling the tarp over the load. In addition, since the elasticized perimeter in its fully stretched condition is longer than the perimeter, it permits pulling down by hand a portion of the elasticized perimeter to form a loop 8 that can be secured by itself, or with hooks or other engagement means, to hooks 22 on the vehicle (see FIG. 1). Or, the hook ends of other individual bungee cords can be hooked to the exposed perimeter cord 4 in the area of the relieved portions 6. In an alternative, the exposed portion 6 of the bungee cord 4 can be enclosed in an overwrap or sheath.

Preferably, the perimeter elastic cord is not stitched to the tarp, but rather is free floating within the sleeve. While the perimeter elastic cord may be of any general size, it is generally somewhat smaller in diameter than the main cords 10 criss-crossing the tarp which are described in more detail below. Further, the perimeter elasticized cord can be a single continuous cord, or it may be four cords parallel to the edges joined at the corners. It is preferred that the cord(s) be trapped within the sleeve 3 so that it does not get pulled out of the sleeve, as it would be very difficult to re-thread through the sleeve.

FIG. 2 also shows a plurality of elasticized reinforcing cords 10 which serve a variety of purposes. Two important purposes include functioning as tie downs for the tarp and to aid in securing the load. Elasticized reinforcing cords are not intended to be substitutes for stronger rope or cable load-securing lines for large or heavy loads, because movement of the load can stretch the cords beyond their elastic limit causing them to break. However, the elasticized reinforcing cords help snug down the tarp to the load and therefore the load to the vehicle.

FIG. 2 shows a variety of alternatives for conciseness, but it should be understood that these alternatives can be used uniformly throughout the entire tarpaulin assembly 1. For example, in the upper half of the tarpaulin, semi-circular cut-out portions 5 of tarpaulin are shown. These function as hand holds and hook holds. In the lower half, the marginal sleeve 3 is relieved at areas 6 so that the cord 4 shows. This permits the exposed portion of the elasticized cord 4 to be drawn downwardly and hooked on to a hook 22 on the vehicle as best shown in FIG. 1. Still another alternative is shown on the upper marginal edge of the tarpaulin in FIG. 2. There, a small gap 7, preferably triangular, is cut into the sleeve 3 and folded back on itself. Then a loop 8 of the cord 4 is withdrawn. It is maintained in the loop shape by a crimped metal collar 9.

Thus, by use of any one or more of these alternatives alone or in combination, the tarpaulin of this invention is provided with elasticized tie-down means. With respect to the cut-out portions 5, these are hand-holds which permit handling of the tarpaulin, especially the action of arranging it properly on the load. In addition, while the continuous perimeter sleeve 3 adjacent to the cut-out portion 5 prevents the peripheral elasticized cord 4 from being drawn down around a hook or catch on the body of the vehicle, it does permit alternative engagement means to secure the tarpaulin to a vehicle such as a hook of a separate independent bungee or shock cord, or rope. And this is accomplished without having to have a metal grommet which could damage or mar a sensitive load item or the vehicle.

In the alternative, one can grasp the elasticized cord 4 in the relieved area 6 of the sleeve 3 as shown in the lower half of FIG. 2. Also, the loops 8 can be used in a similar manner to engage hook 22 on the vehicle. As noted on the left side of FIG. 2, there are three relieved portions 6 or cut-outs 5 along the half of the longitudinal edge, whereas on the right side only two are shown. This is to illustrate that any appropriate selected number of these hand hold cut-outs or relieved areas can be employed as desired. Likewise, three are shown on the bottom and two loops at the top.

FIG. 2 shows that there are a series of criss-crossing elasticized reinforcing cords 10 which are fully or partially overlain with material 11. As shown, relieved areas 12 are provided. These elasticized reinforcing cords 10 are stretched to their reasonably fullest extent and then the material 11 is lain over them and they are stitched as at 13 in the areas of the material 11 to the underlying tarpaulin material 2 in the stretched condition. The elasticized reinforcing cord is not stitched to the tarpaulin in the relieved areas 12 (see FIG. 4). Thus, upon relaxation, the tarpaulin is gathered by these elasticized reinforcing cords. These elasticized reinforcing cords 10 are of a heavier weight than the perimeter cord 4, because they serve both the function of providing expandability to the tarpaulin and load securing members.

Note by reference to load securing rope 14, shown in phantom in FIG. 2, the relieved areas 12 can be aligned so that an auxiliary load securing tie down rope 14 can be retained in position by the elasticized cords 10 when the rope 14 is passed between the elasticized cord 10 and the top surface of the tarpaulin 1.

Optional loops 15 of material may be stitched to the face of the tarpaulin 1 to permit the passing therethrough of additional load securing ropes, or as a reinforced loop to which hooks of other independent shock cords can be secured.

FIG. 1 shows extensions 16 of cords 4 beyond the outer periphery of the tarpaulin 1 to provide elasticized extensions 16 having terminal securing hooks 21 thereon. These extensions may be any desired length, but usually 12 inches to 2 feet long, and preferably are not sheathed. It should be understood that in this embodiment, rather than having a cord 4 which is continuous around the periphery, four separate elasticized cords may be employed. These separate elasticized cords can be stitched in the sleeves at their ends as shown at 17; or throughout the full length of the sleeve 3, but not in the relieved area 6. These cords are stitched in the stretched condition. This stitching serves two functions, first to securely reinforce the perimeter, and also to prevent the cords from being fully withdrawn from their sleeves. Likewise, in the middle section, the elasticized reinforcing cords 10 can extend as at 23 beyond the side marginal edge of the tarpaulin and may terminate in hooks 21. These serve the same functions as the extensions 16.

In the case where it is desired to use a single perimeter cord 4, a single extension 24 can be provided at the corner by the diagonal cords 10 rather than extending the two perimeter cords. This is shown in the upper right and left corners of FIG. 2 wherein the extension 24 is formed by extending the diagonal cord 10 and terminating it in a hook 21.

FIG. 1 shows the tarpaulin of this invention in use. A load on truck 30 is shown covered by the tarp 1 of this invention. Loops of the external elasticized cord 4 are created and drawn down around selected hooks 22 on the body of the truck. In addition, the various extensions 16, 23 or 24 are employed to secure the load by engaging hooks or other elements of the truck body.

FIG. 3 shows a transverse section view along the line 3—3 of FIG. 2 in which the cords are in the relaxed condition and the tarpaulin sheet material 2 is shown gathered.

FIG. 4 shows a corner of the tarp in perspective with the end of the transverse reinforcing/tie down cord 10 intersecting with the marginal sleeve 3 having perimeter cord 4 therein. This illustration shows in essence the upper right or left corner of the tarp as shown in FIG. 2. Note that in the relieved area 6, a portion 25 of the sleeve 3 is cut and folded under the cord 4 to expose it in the relieved area. Alternately, the sleeve 3 can be cut in the middle of length 6 and parallel to the marginal edge, then the resulting flaps folded laterally back over the sleeve 3 to provide reinforcing (not shown). Still further, a separate material strip 26 can be stitched at 27 to provide a reinforcing on each side of relieved area 6.

The upper edge of the marginal sleeve 3 is stitched at 28 to the tarp. In addition, the overlaying material 11 is stitched at 13 to the cord 10 when the cord is in the stretched condition, and to the tarp at 17. The relieved portion 12 permits one to grasp the cord 10, or to pass a rope or strap thereunder. The cord 10 extends beyond the edge of the tarp and terminates in a hook 21 forming tie down extension 24.

While the cords are shown round, it should be understood that they may be relatively rectangular in cross-section, thus comprising elasticized webs, and they may be stronger than perimeter web 4.

Another important feature of the invention shown in FIG. 1 is use of safety reflective means secured to the tarp sheet 2, one or more coverings 11, or one or more reinforcing cords 10 to increase the visibility of the tarpaulin to reduce the tendency of vehicles to collide with an object covered by the tarp during use at night or low visibility conditions such as inclement weather.

While a reflective member such as a metal backed plastic reflector may be used, it is preferred to use a reflective coating material such as a glass bead paint. The reflective paint may be placed along band 29 spaced inwardly from the tarp margin, preferably in a warning pattern such as stripes 31. Alternately, the outer faces of coverings 11 may be so treated to provide reflective stripes, X, or V patterns. Or, the paint may be in a word, such as DANGER, a logo or some other pattern. The reflective marking is preferably in a bright color, such as Department of Transportation (D.O.T.) yellow on a blue tarp, or bright orange.

It should be understood that various modifications within the scope of this invention can be made by one of ordinary skill in the art without departing from the spirit thereof. For example hooks 21 may be omitted and eyelets or T's provided instead. I therefore wish my invention to be defined by the scope of the appended claims as broadly as the prior art will permit, and in view of the specification if need be.

I claim:

1. An expandable tarpaulin assembly comprising in operative combination:
    a) a tarpaulin sheet having a central area and at least one marginal edge;
    b) at least one elasticized member disposed in association with the marginal edge of said sheet, each of said members having a retracted length shorter than the length of said marginal edge;
    c) a plurality of elasticized reinforcing members attached to said tarpaulin sheet;
    d) said elasticized reinforcing members extending in geometric, non-spider web paths across said tarpaulin sheet to provide reinforcing to said tarpaulin sheet;
    e) the retracted length of said elasticized reinforcing members being shorter than the length of the tarpaulin sheet along the paths of attachment to said tarpaulin sheet; and
    f) said elasticized members in their natural retracted condition forming gathers in said tarpaulin sheet so that the elasticized members can be stretched to expand the tarpaulin sheet to cover and secure loads of varying size with reduced tendency for wind flap damage to said tarpaulin and wind loss of load material.

2. An expandable tarpaulin as in claim 1 wherein said tarpaulin sheet is selected from a plastic laminate having reinforcing fibers sandwiched between layers of plastic, canvas, and combinations thereof.

3. An expandable tarpaulin as in claim 1 which includes material covering at least portions of said reinforcing members to provide protection and reduce snagging of said reinforcing members.

4. An expandable tarpaulin as in claim 3 wherein said covering material has spaced and aligned gaps exposing a portion of the elasticized reinforcing members to permit a user to grasp the reinforcing members, to engage a securing means to the reinforcing members, or to pass additional securing means underneath the exposed reinforcing members.

5. An expandable tarpaulin as in claim 4 wherein said marginal edge comprises at least one sleeve portion in which said marginal edge elasticized member is disposed to contain and protect said elasticized member.

6. An expandable tarpaulin as in claim 1 wherein said marginal edge comprises at least one sleeve portion in which said marginal edge elasticized member is disposed to contain and protect said elasticized member.

7. An expandable tarpaulin as in claim 6 wherein said sleeve has spaced gaps exposing the elasticized member to permit a user to grasp the exposed portion of the elasticized member to position the tarpaulin sheet, to engage a securing means to the exposed portion of the elasticized member, or to stretch the exposed portion of the elasticized member to engage it to a securing member.

8. An expandable tarpaulin as in claim 7 wherein the exposed portion of the perimeter elasticized members are formed into the shape of a loop, and which includes a clamp member at the base of the loop to maintain the permanent loop shape for use as a loop pull and a securing means.

9. An expandable tarpaulin as in claim 1 wherein said elasticized reinforcing members extend substantially beyond the perimeter edge of the tarpaulin sheet, and which include means for engaging a securing member attached to the end of said extending members.

10. An expanqable tarpaulin as in claim 1 wherein said tarpaulin sheet has four marginal edges, pairs of which intersect at corners, each of said marginal edges includes at least one elasticized member extending beyond said marginal intersection corner, and which includes means for engaging a securing member attached to the outermost end of said extension.

11. An expandable tarpaulin as in claim 10 wherein said reinforcing members are configured in at least one "X" pattern.

12. An expandable tarpaulin as in claim 1 ,wherein said reinforcing members are configured in at least one "X" pattern.

13. An expandable tarpaulin as in claim 1 which includes a plurality of cut-outs adjacent the marginal edge disposed medially of the elasticized member.

14. An expandable tarpaulin as in claim 1 which includes tie down loops secured on said tarpaulin sheet in a generally rectilinear alignment.

15. An expandable tarpaulin as in claim 1 wherein the reinforcing elasticized members are of greater tensile strength than the perimeter elasticized members.

16. An expandable tarpaulin as in claim 1 which includes means for reflecting light disposed on selected surface areas of said tarpaulin sheet to increase the visibility of said tarpaulin sheet thereby reducing the tendency of collision with an object covered by said tarpaulin assembly during use at night and under inclement weather conditions.

17. An expandable tarpaulin as in claim 16 wherein said light reflecting means comprises a reflective coating.

18. An expandable tarpaulin as in claim 17 wherein said selected surface area, on which said reflective coating is disposed, is selected from a coating on at least portions of said elasticized reinforcing members, on coverings for said elasticized reinforcing members, in at least one band substantially parallel to said marginal edge, in a warning pattern, in a logo design or in word(s).

19. An expandable tarpaulin as in claim 5 wherein:
a) said sleeve has spaced gaps exposing the elasticized member to permit a user to grasp the exposed portion of the elasticized member to position the tarpaulin sheet, to engage a securing means to the exposed portion of the elasticized member, or to stretch the exposed portion of the elasticized member to engage it to a securing member;
b) said elasticized reinforcing members extend substantially beyond the perimeter edge of the tarpaulin sheet, and which include means for engaging a securing member attached to the end of said extending members;
c) said elasticized reinforcing members are configured in at least one "X" pattern;
d) said reinforcing elasticized members are of greater tensile strength than the perimeter elasticized member; and
e) which includes means for reflecting light disposed on selected surface areas of said tarpaulin sheet to increase the visibility of said tarpaulin sheet thereby reducing the tendency of collision with an object covered by said tarpaulin assembly during use at night and under inclement weather conditions.

20. An expandable tarpaulin as in claim 19 which includes:
a) tie down loops secured on said tarpaulin sheet in a generally rectilinear alignment; and
b) wherein said light reflecting means comprises a reflective coating.

* * * * *